United States Patent
Harlan

[11] Patent Number: 6,131,926
[45] Date of Patent: Oct. 17, 2000

[54] HOME AND GARDEN TRUCK

[76] Inventor: Campbell A. Harlan, 134 Woodhaven Way, Alpharetta, Ga. 30004

[21] Appl. No.: 09/174,615

[22] Filed: Oct. 19, 1998

[51] Int. Cl.[7] ..................................................... B62B 1/02
[52] U.S. Cl. .................................. 280/47.26; 280/47.27; 280/47.28; 280/47.29
[58] Field of Search ............................ 280/47.17, 47.19, 280/47.24, 47.26, 47.27, 47.28, 47.35, 47.29

[56] References Cited

U.S. PATENT DOCUMENTS

| | | |
|---|---|---|
| 2,320,387 | 6/1943 | Schroeder . |
| 3,052,484 | 9/1962 | Huffman et al. . |
| 3,179,270 | 4/1965 | Taragos . |
| 3,734,526 | 5/1973 | Propst et al. . |
| 4,281,843 | 8/1981 | Johnson et al. . |
| 4,363,496 | 12/1982 | Schreiner . |
| 4,790,549 | 12/1988 | Armand . |
| 5,464,104 | 11/1995 | McArthur . |
| 5,465,987 | 11/1995 | DellaVecchia . |
| 5,474,312 | 12/1995 | Starita et al. ........................ 280/47.29 |
| 5,595,395 | 1/1997 | Wilson . |
| 5,671,933 | 9/1997 | Tucker . |

*Primary Examiner*—Richard M. Camby
*Attorney, Agent, or Firm*—Harness, Dickey & Pierce, P.L.C.

[57] ABSTRACT

A handtruck is described for safely and securely supporting, storing, and transporting items of various sizes and shapes. The handtruck is comprised primarily of a pair of spaced substantially side rails interconnected by a plurality of cross-members, and one or more load carrying members removably fastened to one or more of the cross-members.

19 Claims, 2 Drawing Sheets

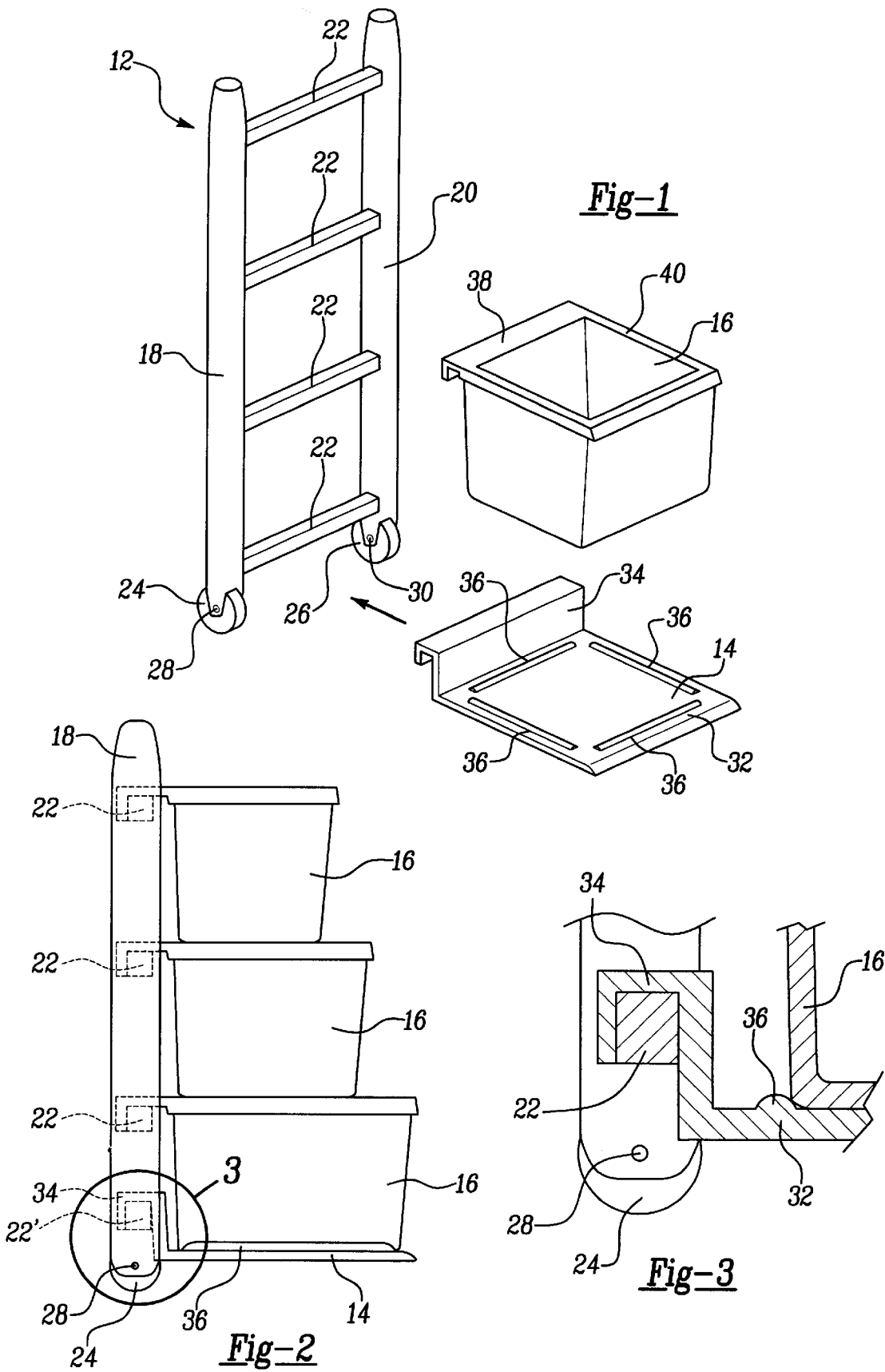

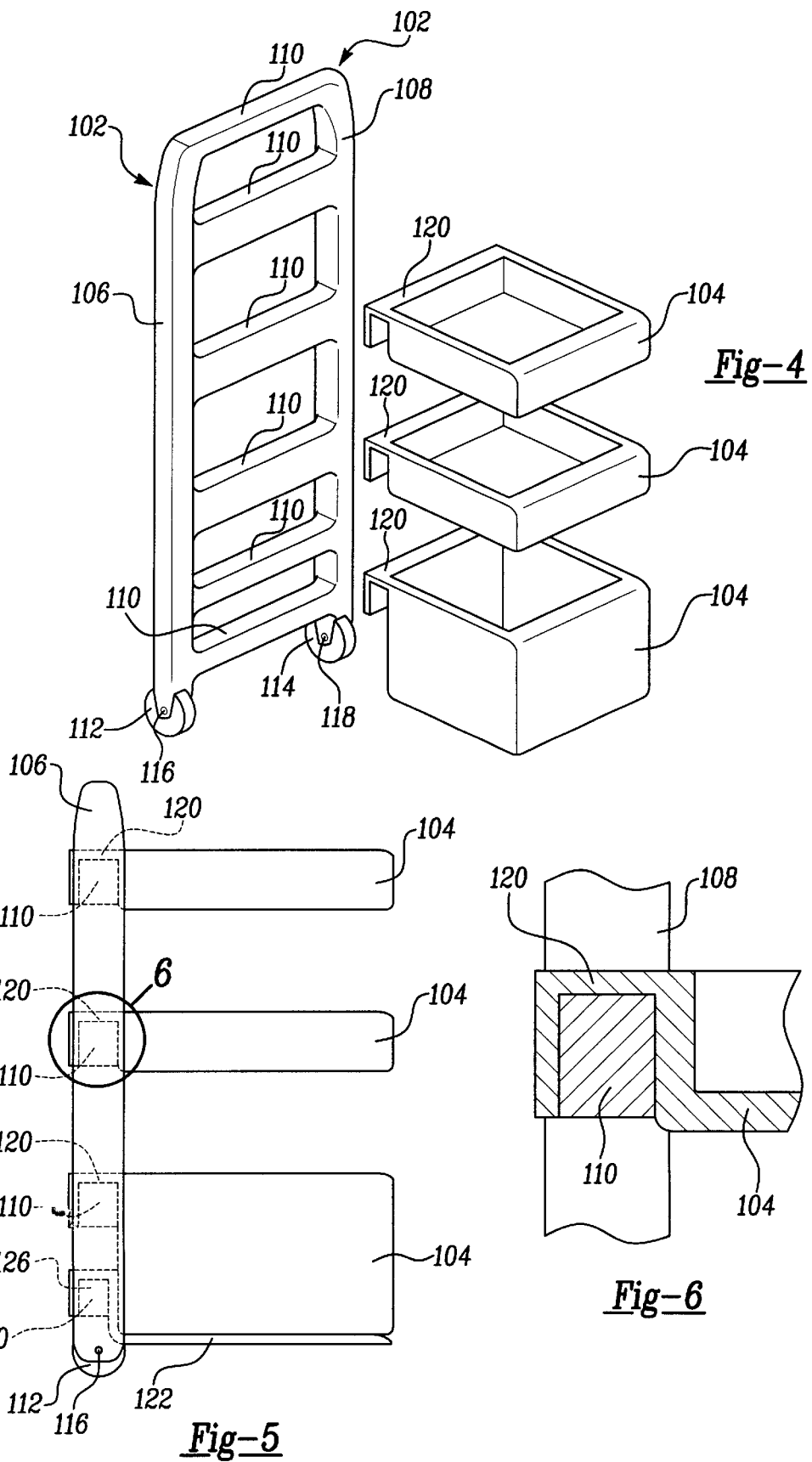

HOME AND GARDEN TRUCK

BACKGROUND AND SUMMARY OF THE INVENTION

1. Technical Field

The present invention relates generally to wheeled, hand-propelled handtrucks, and more particularly to a handtruck having a plurality of load carrying members of various shapes and sizes removably fastened to the handtruck frame structure.

2. Discussion

Conventional handtrucks are commonly used to transport items that would otherwise be difficult for an individual to transport over any appreciable distance. Such handtrucks are generally comprised of a pair of spaced substantially parallel elongated side rails that are interconnected by a plurality of rigidly affixed cross-members. A substantially planar toe plate or blade is typically rigidly and permanently affixed to the bottom of the side rails. The item to be transported is usually placed on the top surface of the toe plate with any additional items then being stacked upon the previously loaded item. To aid in moving the loaded handtruck, two wheels are provided at the lower end of the side rails. To control the handtruck, a pair of handles or grips is typically provided in proximity to the top of the side rails.

Although conventional handtrucks have shown utility in transporting items that are substantially square or rectangular in configuration (e.g., boxes, crates, certain household appliances, etc.), they are not particularly useful in transporting items that have an irregular configuration (e.g., garden tools and implements, chemicals, flowers, plants, shrubs). Additionally, items that do not have a fixed or definite configuration (e.g., sand, soil, mulch, fertilizer, water) also present problems for conventional handtrucks.

Therefore, tasks that require transporting items having irregular and/or indefinite configurations usually must be carried out by hand, without resort to a conventional handtruck, or in a container supportable by the toe plate of a handtruck. These tasks can require multiple roundtrips.

For example, consider the task of planting a rose bush. Typically, the following materials are needed: the rose bush itself, a shovel to dig the hole, soil, peat moss, fertilizer, mulch, insecticides, fungicides, and water to ensure that the roots of the rose bush do not dry out. Attempting to transport these materials to the intended site with a conventional handtruck would involve many roundtrips, could cause damage to the rose bush, would likely cause spillage of the materials during transit, and could result mixing and contamination of the materials.

Therefore, there exists a need for a handtruck that is capable of safely and securely transporting items that have irregular and/or indefinite configurations without damaging, spilling, or contaminating the items being transported. There also exists a need for a handtruck that is capable of supporting containers of various sizes and shapes, together or separately.

The present invention provides a device for supporting, storing, and transporting such items. The device is generally comprised of a frame structure having a pair of spaced substantially parallel side rails with a pair of wheels mounted thereto. A plurality of uniquely utilized spaced cross-members interconnect the side rails. Containers and load supporting members of various sizes and shapes are removably fastened to the cross-members.

A more complete appreciation of the present invention and its scope can be obtained from understanding the accompanying drawings, which are briefly summarized below, the following detailed description of the invention, and the appended claims.

BRIEF DESCRIPTION OF THE DRAWINGS

FIG. 1 is an exploded perspective view of a handtruck, in accordance with one embodiment of the present invention;

FIG. 2 is a side elevational view of a handtruck in accordance with the embodiment of FIG. 1 showing the use of additional containers of different sizes;

FIG. 3 is an enlarged partial sectional view showing certain details of the embodiment of FIG. 1, taken from the circled area "3" in FIG. 2;

FIG. 4 is an exploded perspective view of a handtruck, in accordance with an alternative embodiment of the present invention;

FIG. 5 is a side elevational view of the embodiment of FIG. 4; and

FIG. 6 is an enlarged partial sectional view of a handtruck in accordance with the embodiment of FIG. 4, taken from the circled area "6" in FIG. 5.

The same reference numerals refer to the same parts throughout the various Figures.

DETAILED DESCRIPTION OF THE PREFERRED EMBODIMENTS

With reference to FIGS. 1 through 3, a handtruck in accordance with one embodiment of the present invention is comprised of three primary components: a frame structure 12, a toe plate 14, and at least one container 16. Toe plate 14 and containers 16 are removably fastened to frame structure 12. Thus, the footprint of the handtruck may be significantly reduced by simply removing toe plate 14 and containers 16 from frame structure 12. In this manner, frame structure 12 may be easily placed against a wall or hung up on a wall or ceiling hook for storage. Additionally, if either frame structure 12, toe plate 14, or containers 16 are damaged or destroyed, individual replacement components can be obtained instead of purchasing an entirely new handtruck.

The frame structure 12 is comprised of a pair of spaced substantially parallel side rails 18, 20, a plurality of cross-members 22 interconnecting the rails, and a pair of wheels 24, 26 at the bottom of the rails. Side rails 18, 20 are shown as being substantially elongated; however, they may be any desired length. The exact configuration of side rails 18, 20 is not thought to be critical; therefore, they may be rectangular, square, round, tapered, and the like. Furthermore, this may be comprised of any number of suitable materials such as, but not limited to, metal, wood, plastic, fiberglass, and the like.

Cross-members 22, which interconnect side rails 18, 20, are preferably rigidly affixed to side rails 18, 20 in order to provide the requisite level of stability and ruggedness to the handtruck. Although there are four cross-members shown in this view, it should be recognized that either more or less than this number of cross-members may be employed. The cross-sectional configuration of cross-members 22 will be discussed hereinbelow. Cross-members 22 may be comprised of any number of suitable materials such as, but not limited to, metal, wood, plastic, fiberglass, and the like.

Wheels 24, 26 are rotatably fastened about axles 28, 30, respectively, to aid in moving the handtruck. Alternatively, a single axle (not shown) may optionally be provided for the pair of wheels 24, 26. A pair of handles or grips (not shown) may optionally be provided at the upper or top end of the side rails 18, 20 to aid in controlling the handtruck. Alternatively, one of the upper cross-members 22 may be used to control the handtruck during transit.

Toe plate 14 is a substantially planar member 32 with an inverted U-shaped bracket 34 formed along the edge thereof closest to frame 12. The intended purpose of toe plate 14 is to provide the requisite support to any items (including containers 16 in this embodiment) that may be placed upon toe plate 14. Toe plate 14 may be of any desired length and width to accommodate particular items. In order to keep items from unintentionally slipping off of the top surface of planar member 32, an optional plurality of raised ridges 36 may be provided adjacent the periphery. Raised ridges 36 function to keep the item within a predetermined boundary area on planar member 32. Although raised ridges 36 are shown as being discontinuous, the skilled artisan will recognize that the raised ridges 36 may form a continuous annular lip. Alternatively, planar member 32 may be provided with an optional recessed annular groove (not shown) about its periphery, and container 16 provided with a corresponding optional raised annular lip (not shown) on its bottom surface that would mate with the annular recessed groove of planar member 32.

The cross-member to which toe plate 14 is attached, indicated at 22', is of the non-circular cross-sectional configuration illustrated, and bracket 34 attached thereto (best seen in FIG. 2) is of a relatively close-fitting complimentary shape. This shape is chosen so as to prevent relative rotation between the toe plate and cross-member, while permitting easy engagement and disengagement of the relative parts. This shape may have a slight upwardly taper to facilitate attachment, if desired. For flexibility in the location of toe plate 14 with respect to frame structure 12, each of the cross-members are preferably of the same cross-sectional shape, as described; however, they need not be provided the lowermost one used is of this shape.

In this first embodiment, the bottom container 16 is intended to be placed directly on top of toe plate 14. Each additional container 16 is intended to be placed on top of the container located directly beneath it, to be supported thereby, as best seen in FIG. 2. In this embodiment each container 16 has a generally L-shaped bracket 38 integrally formed along the edge thereof closest to frame 12, and configured so as to be loosely received by one of the cross-members 22. This provides stability in the event the handtruck is tilted forwardly because the bracket will engage the cross-member. When a load is applied to container 16, it will not become dislodged from cross-member 22 due to the fact that the toe plate 14 is attached to its respective cross-member 22'. In accordance with an alternative embodiment of the invention, bracket 38 may be completely eliminated. However, for added stability in the event that the loaded handtruck is inadvertently tilted forward, it is preferred to provide a bracket 38 on each container.

Each container 16 is a substantially square or rectangular open receptacle having in this embodiment a substantially L-shaped bracket 38. Containers 16 may be configured so as to have any number of heights, depths, widths, lengths, and curvatures, depending on the items to be transported. The containers when not needed for transport, may function simply to store items separate from frame 12. For reinforcement containers 16 may be provided with an integral annular lip 40 extending around the periphery of the top surface. Any number of containers may be employed. Containers 16 may be formed of any number of suitable materials such as, but not limited to, metal, wood, plastic, fiberglass, or the like.

Each container 16 is useful for safely and securely supporting, storing, and transporting items that have irregular and/or indefinite configurations without damaging, spilling, or contaminating the items. Containers 16 are especially useful with respect to delicate items such as flowers, plants, and shrubs, and the like, as well as loosely packed items such as sand, soil, mulch, and the like.

With reference to FIGS. 4 through 6, a handtruck in accordance with an alternative embodiment of the present invention is comprised of two primary components: a frame structure 102 and at least one container 104. In this embodiment the containers 104 are more securably removably fastened to frame structure 102 and do not require the use of a toe plate or another container for support.

The frame structure 102 is comprised primarily of a pair of spaced substantially parallel elongated side rails 106, 108. A plurality of cross-members 110 interconnect side rails 106, 108. Cross-members 110 are rigidly affixed to side rails 106, 108 to provide the requisite level of stability and ruggedness to the handtruck. In this embodiment the rails and cross-members are shown formed integrally with one another, such as in the form of a molded plastic structure, and each of the cross-members has a cross-sectional configuration similar to that of cross-member 22' in the first embodiment. Although there are six cross-members shown in this view, the skilled artisan will recognize that either more or less than this number of cross-members may be employed.

At the lower end of side rails 106, 108 there is provided a pair of wheels 112, 114 rotatably fastened about axles 116, 118, respectively, to aid in moving or propelling the handtruck. The containers 104 are similar to containers 16, except that the bracket 120 is configured similar to the bracket on toe plate 14 of the first embodiment, and, of course, the sizes and shapes may vary.

In operation, bracket 120 is placed completely over one of the cross-members 110. Bracket 120 may be placed on any one of cross-members 110. When a load is applied to the container it will not become dislodged from cross-member 110 due to the action of the force vectors about the cross-member. Thus, there is no need to support one container by stacking it upon an adjacent lower container or toe plate. Thus, containers 104 may be engaged to the cross-members 110 in a spaced manner, whereby one container does not contact an adjacent container. In this way, an individual may access the contents of one container without having to lift or otherwise move an adjacent container out of the way.

It is also noteworthy that containers 104 are fully and securely supported by contacting and engaging a single cross-member 110. This feature is particularly advantageous when transporting flats of flowers, for example, because stacking the flats one on top of another would crush the flowers. A conventional handtruck could safely transport only one flat at a time; however, the handtruck of the present invention can transport multiple flats simultaneously by employing a plurality of spaced shallow depth containers.

With reference to FIG. 6, an optional toe plate 122 similar to toe plate 14 may be provided to support very tall loads (e.g., a bush or tree) or in conjunction with one or more containers 104 to support very heavy loads (e.g., stones, rocks).

In other respects, such as function and design variations, the handtruck is similar to that of FIG. 1–3.

The foregoing description is considered illustrative only of the principles of the invention. Furthermore, because numerous modifications and changes will readily occur to those skilled in the art, it is not desired to limit the invention to the exact construction and process shown as described above. Accordingly, all suitable modifications and equivalents that may be resorted to that fall within the scope of the invention as defined by the claims that follow.

What is claimed is:

1. A handtruck for supporting, storing, and transporting items, comprising:
   a pair of spaced substantially parallel side rails;
   a plurality of spaced cross-members interconnecting said side rails;
   a toe plate removably fastened to one of said cross-members, said toe plate including a bracket member extending along at least a portion of a peripheral edge thereof, said bracket member engaging only one of said cross-members so as to permit a load to be applied to said toe plate without causing said toe plate to become dislodged from or rotate with respect to said cross-member, said bracket member substantially enveloping said cross-member; and
   a pair of wheels mounted to said side rails.

2. The handtruck of claim 1 wherein said cross-members are non-circular in cross-section and said container has a bracket of complimentary shape removably engaging said cross-member in a non-rotative relationship.

3. The handtruck of claim 1 further comprising at least one container removably fastened to another one of said cross-members.

4. The handtruck of claim 3 wherein the container rests on said toe plate.

5. The handtruck of claim 3 wherein the container contacts an adjacent container and is supported thereby.

6. The handtruck of claim 3 wherein said container contacts a single cross-member.

7. The handtruck of claim 3 wherein said container includes a bracket member extending along at least a portion of a peripheral edge thereof, said bracket member engaging said cross-member so as to permit a load to be applied to said container without causing said container to become dislodged from or rotate within respect to said cross-member.

8. The handtruck of claim 3 wherein said container includes means extending along at least a portion of a peripheral edge thereof for supporting an adjacent container thereon.

9. The handtruck of claim 3 wherein said toe plate includes means extending along at least a portion of a peripheral edge thereof for locating and retaining a container resting thereon.

10. The handtruck of claim 1 wherein said side rails and cross-members and formed integrally with one another.

11. The handtruck of claim 1 wherein said cross-members are non-circular in cross-section and said toe plate has a bracket of complimentary shape removably engaging said cross-member in a non-rotative relationship.

12. A handtruck for supporting, storing, and transporting items, comprising:
    a pair of spaced substantially parallel side rails;
    a plurality of spaced cross-members interconnecting said side rails;
    at least one container removably fastened to one of said cross-members; and
    a bracket member extending along at least a portion of a peripheral edge of said container, said bracket member engaging only one of said cross-members so as to permit a load to be applied to said container without causing said container to become dislodged from or rotate with respect to said cross-member, said bracket member substantially enveloping said cross-member;
    said container engaging a single one of said cross-members.

13. The device of claim 12, wherein there are a plurality of containers with at least one container resting on top of an adjacent container.

14. The handtruck of claim 12, wherein said containers are of dissimilar configuration.

15. The handtruck of claim 12, further comprising a toe plate removably fastened to one of said cross-members.

16. The handtruck of claim 15, wherein said toe plate includes a bracket member extending along at least a portion of a peripheral edge thereof, said bracket member engaging said cross-member so as to permit a load to be applied to said toe plate without causing said toe plate to become dislodged from or rotate with respect to said cross-member.

17. The handtruck of claim 15, wherein said container rests on said toe plate.

18. The handtruck of claim 15, wherein said toe plate includes means extending along at least a portion of a peripheral edge thereof for supporting a container thereon.

19. The handtruck of claim 13 wherein said container includes means extending along at least a portion of a peripheral edge thereof for supporting an adjacent container resting thereon.

* * * * *

UNITED STATES PATENT AND TRADEMARK OFFICE
CERTIFICATE OF CORRECTION

PATENT NO. : 6,131,926
DATED : October 17, 2000
INVENTOR(S) : Campbell A. Harlan It is certified that error appears in the above-identified patent and that said Letters Patent is hereby corrected as shown below:

Column 3, line 26, "complimentary" should be -- complementary --.

Column 4, line 62, "FIG." should be -- FIGS. --.

Column 5, line 23, "complimentary" should be -- complementary --.

Column 5, line 39, "within" should be -- with --.

Column 6, line 2, "and" should be -- are --.

Column 6, line 5, "complimentary" should be -- complementary --.

Signed and Sealed this

Fifteenth Day of May, 2001

Attest:

NICHOLAS P. GODICI

Attesting Officer     Acting Director of the United States Patent and Trademark Office